United States Patent [19]

Moses

[11] 4,390,986
[45] Jun. 28, 1983

[54] DIGITAL SUBSCRIBER COMMUNICATION SYSTEM

[75] Inventor: Donald W. Moses, Minneapolis, Minn.

[73] Assignee: Seismograph Service Corporation, Tulsa, Okla.

[21] Appl. No.: 142,137

[22] Filed: Apr. 21, 1980

[51] Int. Cl.³ .............................................. H04J 3/06
[52] U.S. Cl. .................... 370/99; 340/870.14; 340/825.21; 370/4; 370/50; 370/70; 370/105
[58] Field of Search .................. 370/4, 50, 43, 49, 77, 370/92, 93, 100, 99, 105; 340/155, 157, 183, 203, 825.2, 825.21, 825.44, 825.52, 825.53, 825.57, 825.62, 870.13, 870.14, 870.19

[56] References Cited

U.S. PATENT DOCUMENTS

| | | | |
|---|---|---|---|
| 3,069,504 | 12/1962 | Kaneko | 370/100 |
| 3,363,059 | 1/1968 | Cummins | 370/92 |
| 3,577,202 | 5/1971 | Brightman | 370/77 |
| 3,639,694 | 2/1972 | Deutsch et al. | 370/92 |
| 4,063,220 | 12/1977 | Metcalfe et al. | 370/93 |

FOREIGN PATENT DOCUMENTS

| | | |
|---|---|---|
| 893337 | 2/1972 | Canada . |
| 2045445 | 8/1971 | Fed. Rep. of Germany . |
| 2208159 | 8/1972 | Fed. Rep. of Germany . |

OTHER PUBLICATIONS

"International Zurich Seminar of Digital Communication", PP D(3) 1-5, Mar. 12-15, 1974.

Primary Examiner—Benedict V. Safourek
Attorney, Agent, or Firm—Dorsey & Whitney

[57] ABSTRACT

A digital subscriber communications system for transmitting voice and data information is disclosed. The signal transmissions, on any suitable medium, are in an optimized sixteen bit per frame format with a framing bit in each frame. The framing bit is detected with unique circuitry and used to phase a master synchronization signal for decoding the information transmitted.

41 Claims, 8 Drawing Figures

DIGITAL SUBSCRIBER COMMUNICATION SYSTEM

BACKGROUND OF THE INVENTION

This invention relates to a distributed, broadband cable sending and receiving system wherein a single transmission medium is used to carry voice and data information between a central office location and multiple subscriber locations.

It is well known in the art that cable television systes using coaxial cable, and telephone systems using twisted pair cable, as the transmission mediums, are capable of delivering voice and data services by means of analog or digital carrier systems, or by the use of modems. Existing digital systems are primarily used to carry a large number of multiplexed voice circuits from one point to another. The purpose of the present invention is to distribute both voice and data information.

Existing distributed digital systems using multiplexed digital baseband transmission have a cost disadvantage relative to the present invention because the higher bit rates necessary to service each subscriber location require more expensive circuit components and require more complex framing and demultiplexing tasks to be performed at each subscriber location.

Existing analog carrier systems have a greater susceptibility to noise and beat-frequency interference than digital systems and are not designed to provide both voice service and high speed data services without additional subcarriers or modems. Existing analog, distributed carrier systems also generally use a separate set of allocated frequencies for each subscriber, making it necessary to use greater bandwidth on the transmission medium relative to the present invention due to the necessity of having spectrum dedicated to subscribers when they are not sending or receiving information.

Existing data modems can be used to transmit and receive both voice and data services but are not currently cost-effective since their polling, addressing or contention formats are optimized for data transmission. And existing systems do not use a combination voice and data format to provide a uniform voice sampling rate with low bit overhead.

SUMMARY OF THE INVENTION

The preferred embodiment of the invention utilizes an optimum bit format and frequency synthesized, FDM, concentrated transmission in order to provide a combination of voice and data services in the most efficient and cost-effective manner. The advantages of the present invention over existing carrier systems and data modems are achieved with use of an optimized sixteen bit digital format; the use of an encoded framing bit in each frame indicating phasing criteria for a master synchronization signal having positive and negative transitions that define the beginning, mid-point and end of each frame; the use of an optimized method of detecting the framing bit and distinguishing it from all other bits in the frame; the use of frequency synthesized receivers and transmitters in order to serve more subscribers than the number of available FDM channels; and, the use of a common control signal, with a binary addressing scheme, to continuously manage the frequency allocations of each individual subscriber terminal and transmit data information to the subscriber terminals.

Frequency synthesized transmitters and receivers are widely used in communications systems where switching from one FDM channel to another is a desirable feature. The present invention, however, combines this feature with the novel and uniquely optimized features in order to provide an optimized system uniquely designed to deliver digitized voice and data services in a distributed digital subscriber communications system at a minimum cost. One preferred embodiment places sixty-four FDM channels within a pair of twelve megahertz frequency bands, one for each direction of transmission. A common control signal is added to one direction of transmission. There are two hundred fifty-six subscribers served by the system giving a ratio of four subscribers per available channel. Each subscriber has access by use of a frequency synthesized receiver and transmitter to any one of the 64 two-way FDM channels. The system is considered cost optimized because all subscriber terminals are identical and can be mass-produced; the common control signal has the capacity for future additional data handling capabilities; and, the amount of spectrum used per subscriber is minimized due to the concentrator function of the system.

Another embodiment of the invention does not use the control signal and each of sixty-four subscribers are, with switches, dedicated to a specific channel for voice and data transmissions.

Another embodiment of the invention uses only the control signal and only one of up to two hundred fifty-six subscribers can transmit data at a time.

To practice the invention all data transmissions use a sixteen bit format per frame, which optimizes the design and operation of the communication system for several technical reasons which will be discussed in more detail below. Each sixteen bit frame of information contains a framing bit which is detected and used to properly phase an eight kilohertz master synchronization (MSI) signal with respect to the received digital signal. The framing bit is unique and distinguishable from other bits in the frame because it carries an alternating logic "1", logic "0" pattern. In the present invention it can be placed at the beginning, mid-point or at the end of each frame.

In the preferred embodiment the framing bit is the bit preceding each digitized voice transmission. The use of a framing bit in each frame allows all frames to be identical in structure and provides superior frame-up characteristics with respect to other known methods. It cannot be over emphasized how important the frame-up characteristic is in a concentrated system where receivers are constantly being switched from one received channel to another. Other known carrier systems, that use framing circuitry, frame-up only occasionally. The alternating pattern is not new but commonly used in the art. The method used to detect this pattern and its frequency of use is, however, new and novel.

The frame bit detection begins with a random selection of a bit within the received frame. A number of tests are made to determine if this bit violates the alternating code. A feature of the present invention is the testing procedure.

The received, selected bit logic levels are used to toggle a flip-flop. The flip-flop output will first go to logic "1" with the first received logic "1" signal; and will remain at logic "1" after the receipt of a logic "0" during the next frame (but would switch to logic "0" if two logic "1"'s are received in succession). Assuming the receipt of a valid alternating framing bit signal, the flip-flop check signal output, termed CK signal, will remain logic "1" for two frames. The third frame's logic "1" will cause the CK signal to change to logic "0". The fourth frame's logic "0" will cause this logic "0" state to continue until a logic "1" is received in the fifth frame. The result is a squarewave signal, CK, having a frequency of one-half the frame rate; i.e., four kilohertz, and having characteristics that are easily tested by a circuit which uses inexpensive and readily available digital circuit elements.

For purposes of discussion, one complete cycle of the above described four kilohertz, CK, squarewave signal can be considered to be divided into eight check-points equally spaced and coincident with the positive and negative transitions of a sixteen kilohertz signal. For example, check-point four falls at the CK signal negative transition, at the mid-point of the cycle, and check-point eight falls at the positive transition of the next cycle and, therefore, check-point eight of one cycle is check-point 0 of the next.

The first test is a check for repetitive zeros. If repetitive zeros are detected, an error signal indicating repetitive zeros is generated. The second test is to check the logic level of the CK signal at check-point three. If a logic "0" is detected an error signal indicating check-point three "0" is generated. The third test is to check the CK signal logic state at check-point five. If a logic "1" is detected an error signal indicating check-point five "1" is generated. The final test of the cycle is to check the CK signal logic level at check-point seven. If a logic "1" is detected an error signal indicating check-point seven "1" is generated.

These four error signals are combined. Any error signal, during any CK signal cycle, causes the framing circuit to reset and select another bit, within the frame, to test for framing bit validity. This process is repeated until the proper framing bit is selected. As in other existing digital systems, the bits carrying information are restricted from indicating an alternating logic "1", logic "0" pattern.

Testing the toggled CK signal logic levels for validity is an all-digital method eliminating the practical, empirical problems associated with so-called direct signal technique or other known techniques. Direct tests for validity are often implemented with fewer components but are subject to "sliver errors" and error spikes at frame transition points in some conditions of operation temperature changes and changes in risetimes due to humidity or aging.

A second method of detecting the framing bit, and distinguishing it from all other bits in the frame, is also disclosed. The second method is not on all-digital method, as is the preferred method discussed above, but is a direct signal method with the novel addition of certain analog time constants to minimize error spikes at signal transition points.

These and other advantages, features and objectives of this invention and the manner of attaining them will become more apparent and the invention itself will best be understood by reference to the following description of the embodiments of the invention in conjunction with the accompanying drawings.

DESCRIPTION OF THE PREFERRED EMBODIMENTS

Figure 1:
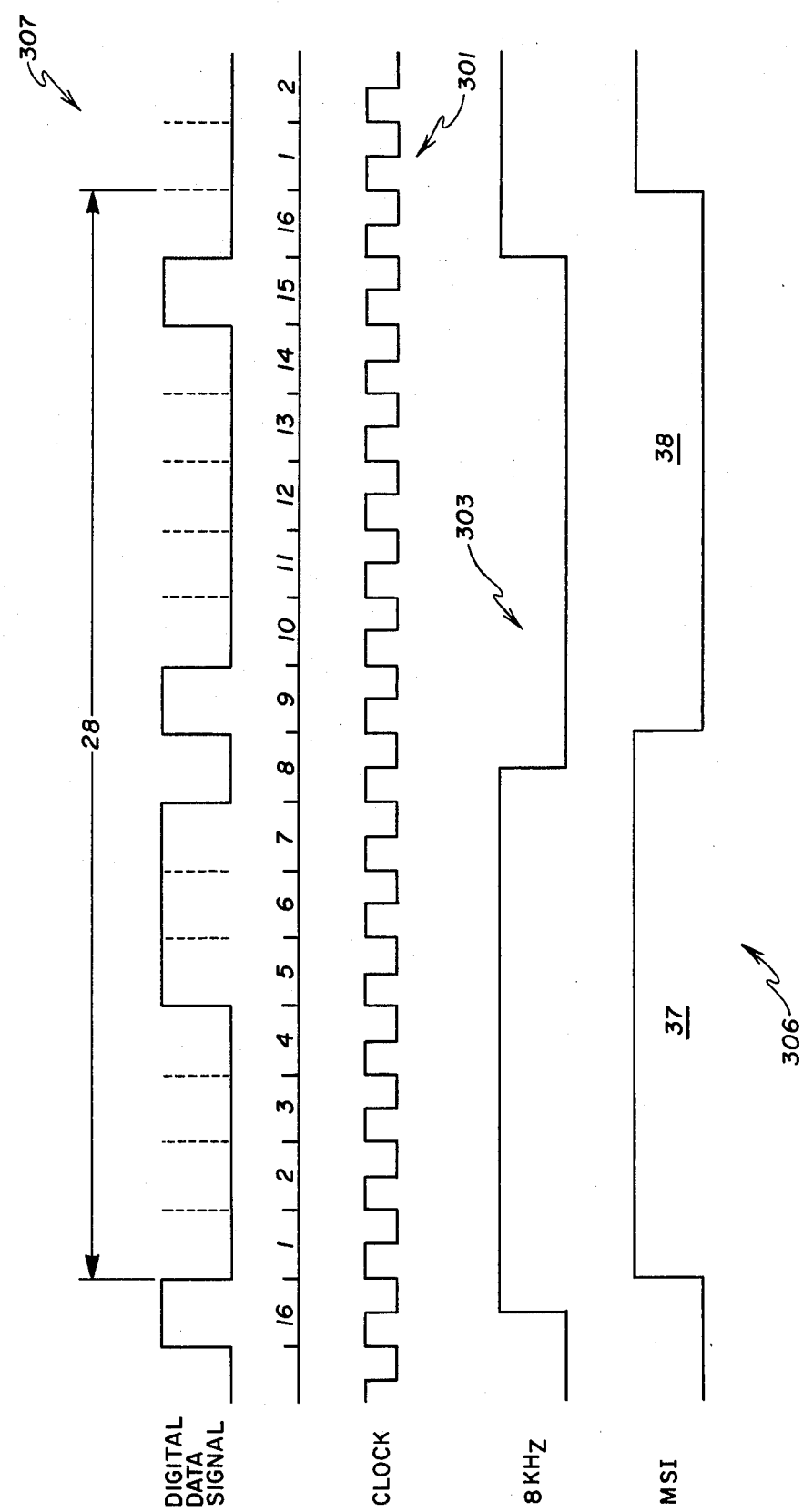
FIG. 1 is a diagrammatic representation of the preferred sixteen-bit format at hypothetical digital signal levels and some of the various signals generated by the circuitry used in practicing the preferred embodiment of this invention.

The preferred embodiment of the invention as disclosed comprises a digital subscriber communications system wherein a plurality of two-directional, time-division multiplexed signals, each having a series of frames and a predetermined number of binary digits per frame, are frequency-division multiplexed (FDM) within a pair of given frequency bands, one for each direction of transmission, onto a single broadband cable for transmission of voice and data services between a central office location and multiple subscriber locations.

While cable transmission is disclosed as a preferred embodiment, those skilled in the art will recognize that the invention can be used on any suitable transmission medium such as twisted pair cable or fiber optics with fibers in each direction of transmission.

Three signal transmissions are employed in the preferred embodiment of the invention, each having the sixteen bit format to be discussed in detail below. However, each transmission can be advantageously used separately until the demand on the communications system is such that the preferred embodiment is put into use.

The preferred embodiment employs two transmissions from the central office terminal to the subscriber, each signal having sixteen bits, 1-16, per frame, 28, at a rate of one hundred twenty-eight kilobits per second. A first control signal is received by all subscribers with each frame, 28, containing eight bits, 1-8, to address a particular subscriber; an FDM channel assignment for the addressed subscriber, a framing bit, 16, and other data bits, 9-15, for the addressed subscriber. The central office also preferably transmits to the addressed subscriber a second transmission on the assigned channel also having sixteen bits, 1-16, per frame, 28, at a rate of one hundred twenty-eight kilobits per second with each frame, 28, containing eight digitized voice bits, 1-8, a framing bit, 16, and other data transmissions, 9-15.

The addressed subscriber terminal transmits back to the central office on the assigned channel on the other frequency band a return signal having sixteen bits 1-16, per frame, 28, at a rate of one hundred twenty-eight kilobits per second, with a voice and data format similar to the above.

The preferred embodiment can be used to service two hundred fifty-six subscribers with sixty-four FDM channels within a pair of twelve megahertz frequency bands, one for each direction of transmission.

In the situation where the per subscriber cost must be minimized or a maximum of sixty-four subscribers are to be served there is a cost advantage in deactivating the common control signal and replacing the common control signal circuitry, at each subscriber location, with a module having miniature switches used to select a different binary number at each subscriber location thus placing each subscriber on a dedicated channel. The control logic at the central office is also removed, in this configuration, for cost savings.

In the situation where a CATV company provides only data services, with no present voice requirements, the system is greatly cost-reduced by eliminating all FDM transmission channels to the subscriber except the common control channel, which addresses up to two hundred fifty-six subscribers, sending seven bits of data per frame, 28. During the interval of time a subscriber is receiving information his transmitter is enabled to transmit on the one return channel, a channel shared by all subscriber terminal transmitters. This provides a very cost effective two-way data service for CATV subscribers, in multiples of two hundred fifty-six subscribers per system, which conserves bandwidth in its initial stages and also is expandable at a later time to full voice and data capability.

The transmission of information between the central office terminal and the subscriber terminal and between the subscriber terminal and the central office terminal by use of AM-DSB or other radio frequency modulation schemes, consists of a series of digital pulses transmitted at a rate of one hundred twenty-eight kilobits per second. The information is transmitted in frames having sixteen bits per frame or, in other words, eight thousand frames per second. Each frame employs a framing bit to phase a master synchronization signal with the frame definition of the received digital signal.

FIG. 1 is a diagrammatic representation of the preferred sixteen bit format at hypothetical digital signal levels. The transmitted signal, 307, is transmitted at a rate of one hundred twenty-eight kilobits per second and is transmitted in frames, 28, having sixteen bits, 1–16, per frame. Consequently, the frames, 28, are transmitted at a rate of eight thousand frames, 28, per second. The bit, 1–16, locations within each frame, 28, are designated in FIG. 1 by the base line notations.

From the transmitted digital signal, 307, a clock signal, 301, is regenerated of one hundred twenty-eight kilohertz which is connected to a divider circuit, 302, for various purposes to be discussed below. One purpose is to phase the Master Synchronization Signal (MSI), 306, shown in FIG. 1. The Master Synchronization Signal, 306, is generated by dividing the received digital signal, 307, regenerated clock signal, 301, by sixteen to create an eight kilohertz signal, 303. The digital signal's, 307, framing bit, 16, is then used to phase the master synchronization signal, 306, with the frame, 28, definition of the received digital signal, 307. This divides the received digital signal, 307, uniquely into two frame halves, 37, 38, of eight bits, 1–8, 9–16, per half, 37, 38, which can conveniently be used for voice transmissions, address transmission, and other data transmission, including the framing bit, 16.

The sixteen bit format per frame, 28, has been selected as the optimum configuration for the digital communications system of the present invention for the following reasons:

In order to efficiently use available digital circuit elements, binary multiple numbers, such as 1, 2, 4, 8, 16, 32 etc., should be used whenever possible. Telephone grade voice codecs require eight bits to be used for the voice service. Therefore, the use of eight bits per frame would require a more complex framing method sinc there would be no dedicated framing bit available, and would require a more expensive supervisory control circuit for European CCITT standard voice transmission since this standard requires supervisory control to be provided separate from the eight voice bits. Additionally, high speed data simultaneous with voice transmission would require a higher frame rate in order to alternate voice and data transmission in some manner which would also be more costly due to the additional overhead bits required to distinguish between voice frames and data frames.

The use of thirty-two bits per frame is an inefficient use of transmission bandwidth and requires added cost in components. A number of bits between eight and sixteen, such as fifteen, would require the same number of digital circuit elements as the use of sixteen bits but would provide less capability and would therefore be less efficient than a sixteen bit format. The use of a number of bits between sixteen and thirty-two such as twenty-four would be just as costly in circuit elements as thirty-two bits but would provide less capability and would therefore be less efficient than the use of either sixteen or thirty-two bits. A sixteen bit format is therefore judged optimum from an efficiency point of view.

The use of a sixteen bit format is also optimum when using the master synchronization signal, 306. As discussed above, the framing bit, 16, is detected and used to properly phase the eight kilohertz master synchronization (MSI) signal, 306, with respect to the received digital signal, 307. The eight kilohertz squarewave MSI signal, 306, is conveniently generated by dividing the recovered one hundred twenty-eight kilohertz clock signal, 301, by sixteen. This uses a single, inexpensive digital circuit element, 302. In one embodiment, the MSI signal, 306, is therefore logic "1" during the time the voice bits, 1–8, are received and logic "0" during the time the data bits, 9–16, are received, or vice versa, depending upon the embodiment. Thus, the demultiplexing of the voice and data information is simple and cost-effective. Other known formats are more complex and wasteful of bit overhead.

The use of a sixteen-bit format is optimum from a transmission circuit element point of view, also. An important parameter of the FDM circuitry is the selectivity of the intermediate frequency (I.F.) filter. The function of this filter is to select the desired FDM signal, rejecting the adjacent signals. It is desirable to space these signals as close as possible in order to conserve bandwidth. L-C and helical type filters, having the necessary adjacent channel rejection, are relatively expensive to implement. The availability and use of ceramic type mechanical filters enables substantial cost savings. Typical ceramic filters having a 4.5 megahertz center frequency have a characteristic bandwidth of approximately one hundred sixty-six kilohertz.

Assuming the use of these ceramic filters, conventional design practice requires that the transmission information bandwidth be less than one hundred sixty-six kilohertz but probably not less than one-half of one hundred sixty-six kilohertz. The sixteen bit format, multiplied by the eight kilohertz sampling rate, gives a one hundred twenty-eight kilobits per second digital information rate. Using a two-bits-per-hertz bandlimiting criteria gives a spectrum bandwidth of sixty-four kilohertz. The use of inexpensive amplitude modulated double sideband transmission (AM-DSB) requires one hundred twenty-eight kilohertz of transmission bandwidth which ideally matches the bandpass characteristics of readily available ceramic filters. An eight-bit format would be extremely wasteful of the bandpass characteristic and a thirty-two bit format would require more complex modulation techniques in order to be adequately bandlimited. The sixteen-bit format is, therefore, judged most efficient and cost-effective to ceramic filter handpass characteristics.

It may be argued that the use of 10.7 megahertz center frequency ceramic filters may allow the transmission of wider bandwidth information than the 4.5 megahertz filters discussed above. However, the use of an I.F. frequency that lies within the transmitting frequency band of the coaxial cable system may require extra conversion stages and therefore extra costs and complexity.

The sixteen-bit format per frame, 28, each frame, 28, having a framing bit, 16, in conjunction with a generated master synchronization signal, 306, for each transmission, 307, is conveniently used to transmit the various types of information between the subscriber and the central office terminal. As discussed, the function of the framing bit, 16, is to phase the MSI signal, 32, with the frame, 28, definition of the received digital signal.

The possible framing bit locations, 1-16, of this invention correspond to the transitions of the MSI signal, 306. The electronically convenient locations place the framing bit, on a time basis, in front of the MSI, 306, transitions. This allows the detection of the framing bit and then the formation of a transition of the MSI signal, 306, at the next clock signal, 301, transition. The framing bit, 1-16, location selected for the preferred embodiment is the last bit, 16, in the frame, 28, allowing the framing bit, 16, to indicate the beginning of the following frame, 28, at the next clock signal, 301, transition.

Preferably the first eight bits, 1-8, of the frame, 28, are dedicated to the address for the control signal and digital voice transmission for the other two signals. A codec requires eight bits and it is, therefore, most convenient to use the frame half, 37, for voice that does not contain the framing bit, 16. Other bits, 9-15, are then available for data transmission and housekeeping purposes.

It has been found advantageous to allocate the bit locations, 1-16, as follows, for the three signals used in the preferred embodiment. The described allocation should be understood to be illustrative, however, and is not meant to limit the invention as claimed.

For the control signal sent by the central office subscriber to address a specific subscriber bits 1 through 8 are the control signal's address location. Using the binary numbers 00000000 through 11111111 (0 through 255) two hundred fifty-six subscribers can be addressed on this one common control channel. Once a subscriber terminal receives its assigned address number, in this frame location, 37, the terminal's data decoder is activated to receive the remaining bits, bits 9 through 16. In this example configuration, bit 9 contains supervisory control information which, in this direction of transmission, instructs the subscriber terminal to ring the subscriber's telephone(s). Bit 10 enables (switches on) the terminal's second receiver, 113, and transmitter, 122. Bit 11 uses a serial code to assign the terminal to one particular channel. Bit 12 contains a second framing bit relating to the serial information in bit 11. Bits 13 through 15 are reserved for future data requirements. Bit 16 is the framing bit.

For the voice and data transmission to the addressed subscriber which are transmitted on the channel assigned by bit 11 of the control signal the first eight bits, 1-8, of the frame, 28, are preferably dedicated to digital voice transmission. The codec requires eight bits and it is therefore most convenient to use the frame-half, 37, for voice that does not contain the framing bit, 16. Bits 9 through 15 are then available for data transmission and housekeeping purposes. In one configuration, bit 9 is reserved for supervisory control even though the signal to ring the subscriber's telephone(s) is normally sent via the common control signal and bits 10 through 15 are used to carry data information to the subscriber with four of these generally carrying asynchronous, lowspeed relay closure type information while the remaining two carry higher speed text or facsimile information.

For the digital signal sent from the subscriber to the central office terminal, the first eight bits, 1-8, of the frame, 28, are preferably dedicated to digital voice transmission, for the reasons expressed above. Bits 9 through 15 are available for data transmission and housekeeping purposes. In one configuration, bit 9 is used for supervisory control which, in this direction of transmission, indicates the off-hook condition of the telephone set(s). Bit 10 carries a serial digital code indicating the subscriber terminal's location number. This number is decoded at the central office location and is used to determine which subscriber terminal is actually transmitting on the frequency being received. This same frequency may be assigned to four or more subscriber terminals, and therefore, the central office requires this location number in order to determine which of the four or more subscriber terminals is operational. Once a terminal transmits on an assigned frequency, the other terminals which were assigned to that same frequency, on a standby basis, are given new instructions.

Bits 11 through 15 are used to carry data service to the central office with three of these generally used to drive four lowspeed, asynchronous relay closure type data channels while the remaining two carry higher speed text or facsimile information. Three bits in this direction can be economically used to carry a larger number of lowspeed data channels because the destination of this information is generally a minicomputer, 208, having ample intelligence to decode the necessary data format. In other embodiments each one bit is used to carry several lowspeed circuits. The only consideration is convenience and minimizing system costs.

Figure 2:
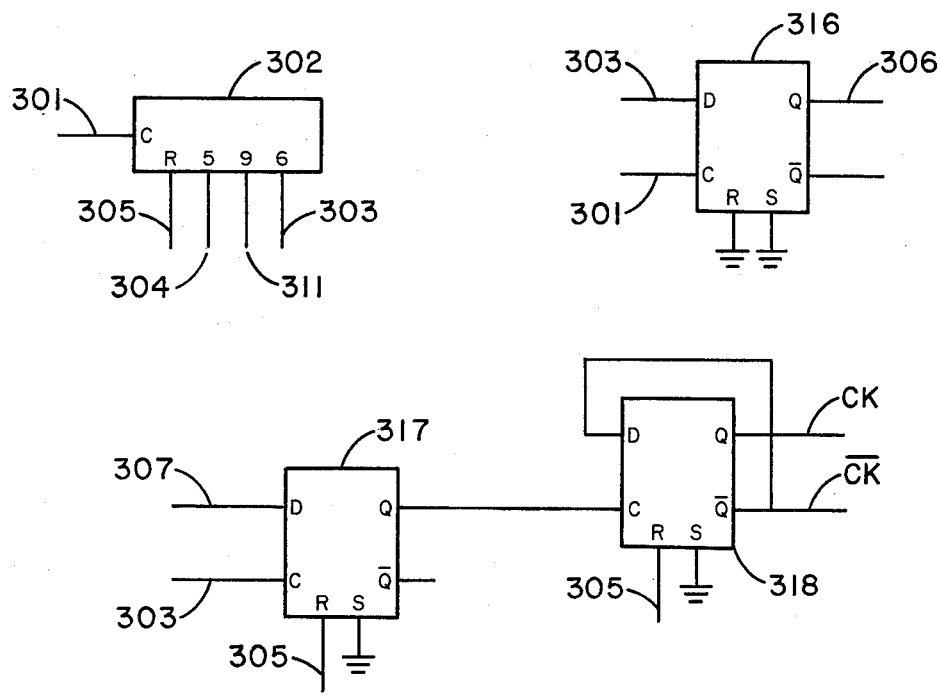
FIG. 2 is a schematic diagram representation of the preferred method of generating the signals necessary to detect the framing bit; and, distinguish it from all other bits in the frame.

FIG. 2 is a schematic diagram representing the preferred method of generating the signals necessary to detect the framing bit, 16; and, distinguish it from all other bits, 1-15, in the frame, 28. The received digital signal, digial signal regenerated clock signal, 301, is fed to the clock input of a CMOS type 4024 divider circuit, 302. The divider circuit, 302, divides the one hundred twenty-eight kilohertz clock signal, 301, into an eight kilohertz signal, 303, a sixteen kilohertz signal, 311, and a four kilohertz signal, 304. The divider circuit 302, is reset by reset signal, 305. The function just described is termed the "framing counter".

The eight kilohertz signal, 303, is fed to the data input of flip-flop, 316. The one hundred twenty-eight kilohertz clock signal, 301, is fed to the clock input of flip-flop, 316. The Q output of flip-flop, 316, provides the received MSI signal, 306. This function is termed the "eight kilohertz signal to MSI conversion".

The received digital signal, 307, is fed to the data input of flip-flop, 317, and the eight kilohertz signal, 303, is connected to this flip-flop's, 317, clock input. Reset signal, 305, is connected to the reset input of this flip-flop. The Q output of flip-flop, 317, is connected to the clock input of flip-flop, 318. This signal is the instantaneous logic level of the randomly selected frame bit. This logic level toggles flip-flop 318, in order to generate the CK and inverted-CK signals. The reset of flip-flop 318, is connected to reset signal 305. The data input and inverted-Q output of flip-flop 318, are connected in order to provide the toggle configuration. This function is termed "toggling the selected data time circuit".

Figure 5:
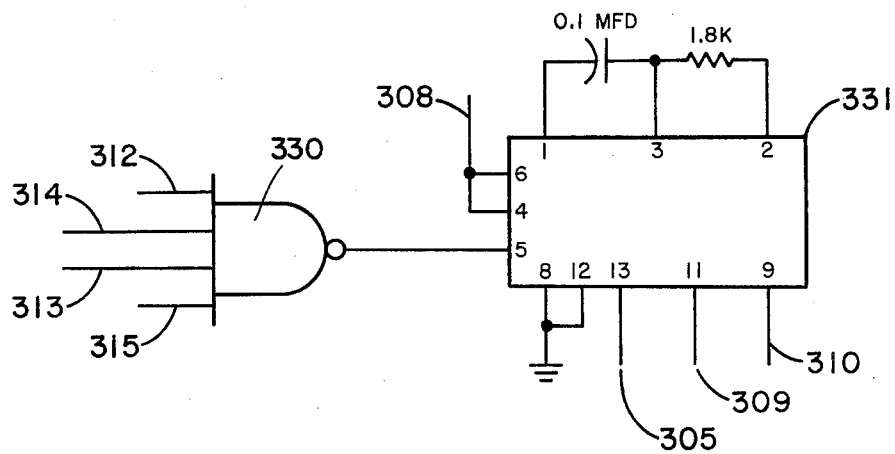
FIG. 5 is a schematic diagram representation of the preferred method of combining the error signals of FIG. 4 and having any error signal cause the framing circuit to reset and select another bit, within the frame, to test for framing bit validity.

The object of the circuitry shown in FIG. 5 is to provide the necessary signals to operate the framing circuit. In addition to the 8-KHz 303, 16-KHz 311, 4-KHz 304 and the MSI 306 signals, this circuit generates the two necessary check signals, CK and inverted-CK, to allow certain tests to be made in order to determine whether the randomly selected frame bit is, indeed, the valid frame bit.

Figure 3:
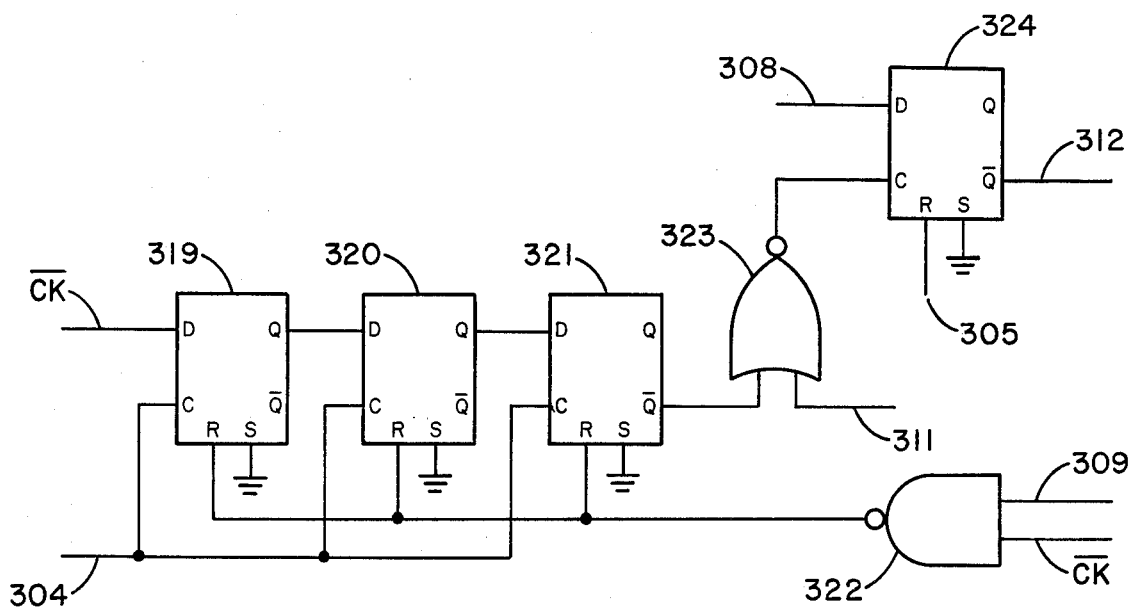
FIG. 3 is a schematic diagram representation of the preferred method of detecting repetitive zeros with the CK signal in order to determine an invalid framing bit selection.

FIG. 3 is a schematic diagram representing the preferred method of detecting repetitive zeros on the CK signal in order to determine an invalid framing bit selection. The inverted-CK signal is fed to the data input of flip-flop 19 and that signal is shifted through flip-flops 320 and 321 at the 4-KHz 304 clock rate. NOR gate, 323, sends a positive transition to the clock input of flip-flop, 324, and repeats this positive transition at a 16-KHz rate if the first NOR gate input, which is connected to the inverted-Q output of flip-flop 21, goes to logic "0". The 16-KHz repetition rate, cause by the 16-KHz signal 311, on the NOR gate's 323, second input, insures that the flip-flop's 324 inverted-Q output 312, will be set to logic "0" without fail. The logic "0" output is caused by the logic "1" 308, fed to the flip-flop's 324, data input; and, a positive transition at the clock input. This condition signals the existence of repetitive zeros on the CK signal. If the CK signal does not consist of repetitive zeros, then, the logic "0", inverted-CK input o NAND gate 322, will cause the shift register (made-up of flip-flops 319 through 321) to reset before the inverted-Q output of flip-flop 321, switches to the logic "0" state. These flip-flops 319–321, are reset by reset signal 305, by means of the inverted-reset 309, signal fed to the first input of NAND gate 322. This circuitry constitutes a repetitive zero detector.

Figure 4:
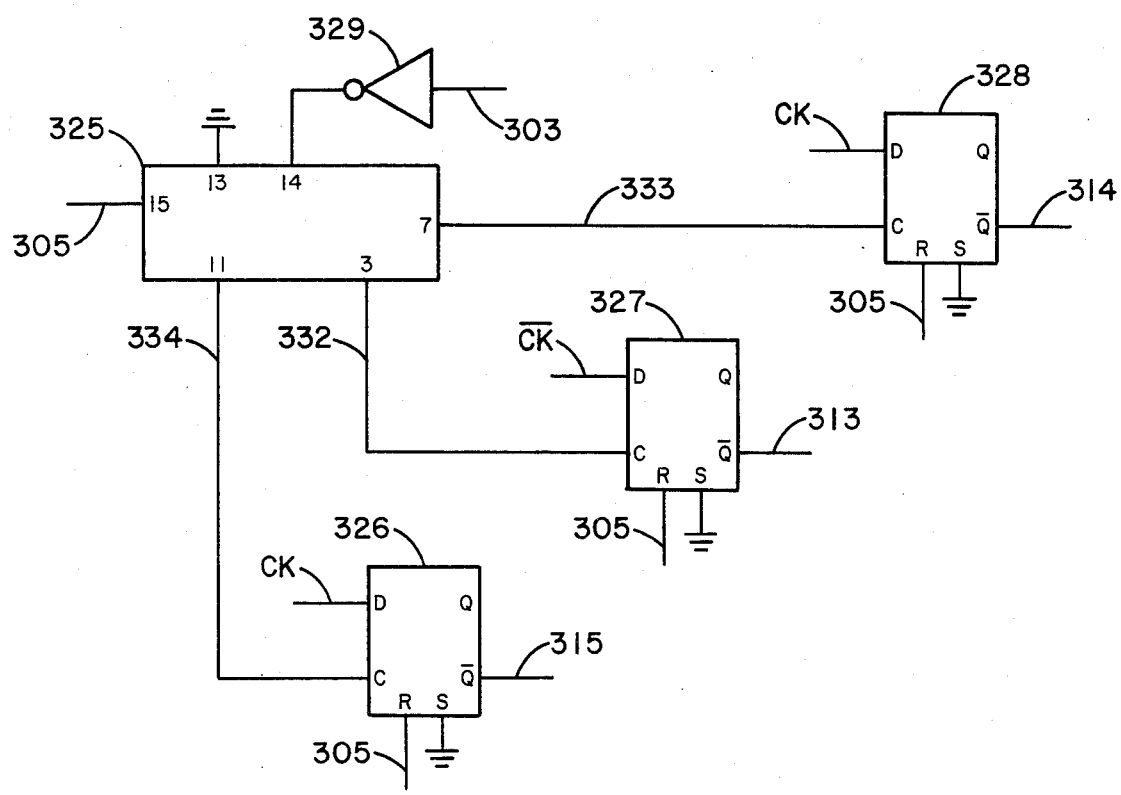
FIG. 4 is a schematic diagram representation of the preferred method of testing the CK signal for determining an invalid framing bit selection.

FIG. 4 is a schematic diagram representing the preferred method of testing the CK signal at various check-points for determining an invalid framing bit selection. The 8-KHz signal 303, is inverted by inverter 329, and fed to the clock input of the CMOS 4022 divider circuit 325. This divider circuit 325 is reset by reset signal 305, and provides three output signals, 332, 333 and 334, which, clock flip-flops 327, 328 and 326, at the proper testing times. The CK signal has a frequency of one-half the framing rate, assuming a valid framing bit is selected, which is four kilohertz. This four kilohertz CK signal has certain characteristics that are easily tested. One complete cycle of the above described four kilohertz CK signal squarewave is, for discussion, divided into eight check-points equally spaced and coincident with the positive and negative transitions of the sixteen kilohertz signal, 311. Check-point 4 falls at the CK signal negative transition, at the midpoint of the cycle, for example. Check-point 8 falls at the positive transition of the next cycle and therefore, check-point 8 of one cycle is check-point 0 of the next.

It can be shown mathematically that, with the repetitive zero test, check-points three, five, and seven are the optimum test points for checking the selected bit's validity. Check-point one falls within certain settling time uncertainties and should not be used. Check-points two, four and six fall on certain mathematically possible transition locations and therefore have an uncertainty factor. Check-points three, five and seven, however, always test a steady-state logic "1" or logic "0". Additional check-points are unnecessary and repetitive; and, fewer check-points would allow certain invalid signals to go undetected.

The first test, of this series, is to check for a CK signal logic "1" at check-point 3. The divider 325 output signal 332 has a positive transition corresponding, in time, to check-point 3. This signal is fed to the clock input of flip-flop 327. The data input of this flip-flop is connected to the inverted-CK signal and the reset is connected to reset 305. The inverted-Q output of this flip-flop goes to a logic "0" if the CK signal at check-point 3 is a logic "0" instead of a logic "1". This error signal, 313, is termed the "check-point 3 '0'" signal.

The divider, 325, output, 333, has a positive transition corresponding, in time, to check-point 5. This signal is fed to the clock input of flip-flop, 328. The data input of this flip-flop is connected to the CK signal and the reset is connected to reset, 305. The inverted-Q output of this flip-flop goes to a logic "0" if the CK signal at check-point 5 is a logic "1" instead of a logic "0". This error signal, 314, is termed the "check-point 5 '1'" signal.

The divider, 325, output, 334, has a positive transition corresponding, in time, to check-point 7. This signal is fed to the clock input of flip-flop, 326. The data input of this flip-flop is connected to the CK signal and the reset is connected to reset, 305. The inverted-Q output of this flip-flop goes to a logic "0" state if the CK signal at check-point 7 is a logic "1" instead of a logic "0". This error signal, 315, is termed the "check-point 7 '1'" signal.

Figure 6:
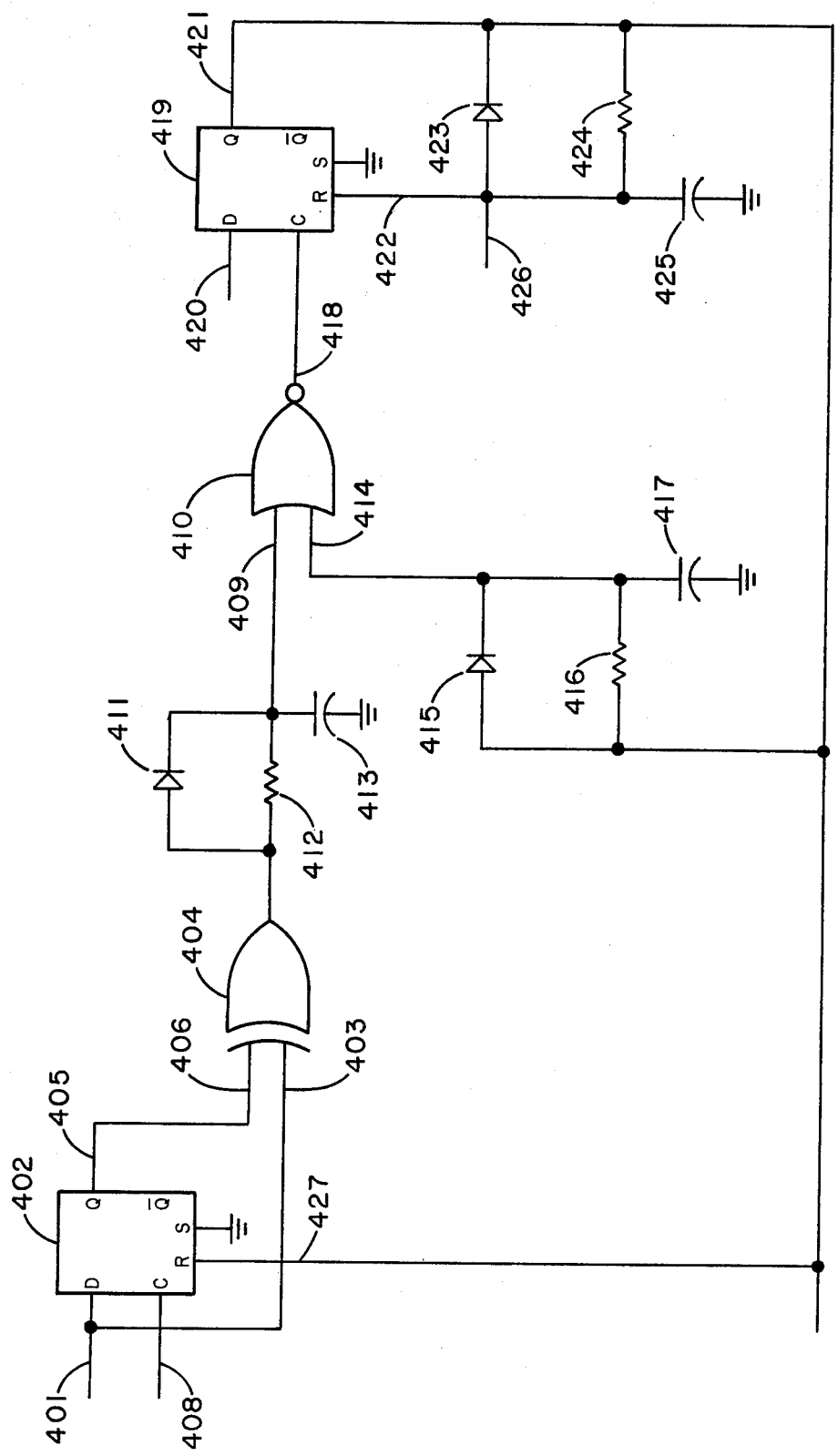
FIG. 6 is a schematic diagram representation of the second method of detecting the framing bit; and, distinguishing it from all other bits in the frame.
Figure 7:
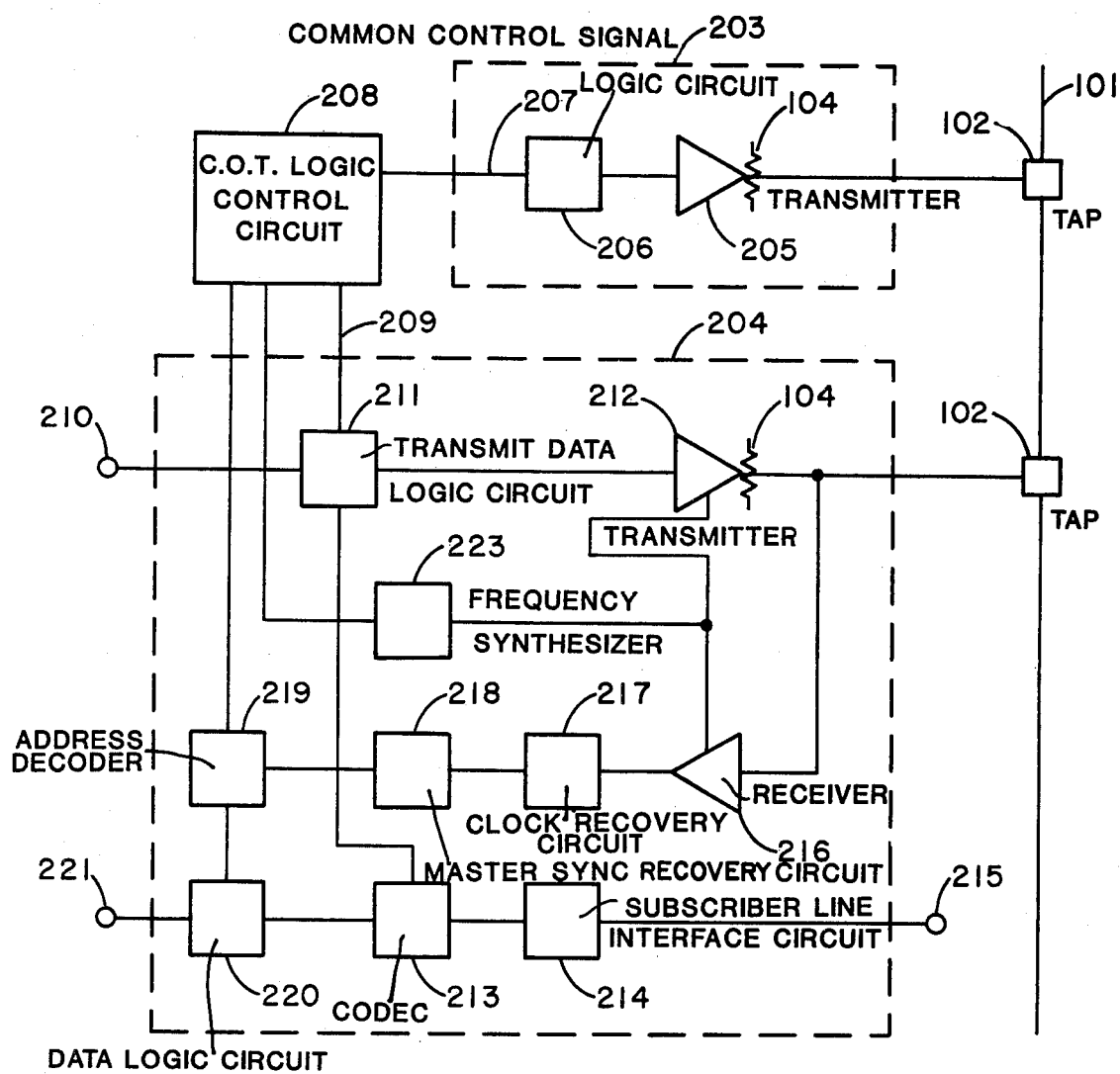
FIG. 7 is a diagrammatic representation of the preferred central office terminal configuration.

FIG. 5 is a schematic diagram representing the preferred method of combining the error signals of FIGS. 6 and 7 and having any error signal, during any CK signal cycle, cause the framing circuit to reset and select another bit, within the frame, to test for framing bit validity. The four error signals, 312, 313, 314 and 315 are connected to the inputs of NAND gate, 330. The NAND gate, 330, output goes to logic "1" if and only if one or more of the error signal inputs goes to a logic "0", indicating an invalid framing bit selection. This enables the astable multivibrator's 331 Q output 305 to go to a logic "1" state, thus resetting all the flip-flops and dividers connected to reset 305, but, also enabling these circuits to make a new, random framing bit selection immediately after reset 305 returns to the logic "0" state. The signal 309 is the inverted-Q output of the astable multivibrator 331. The signal 310 is the input to the astable multivibrator 331 reset, and provides a reset signal to insure that the astable multivibrator 331 is in the reset state when the circuit is initially powered up.

The circuitry discussed above and shown in FIGS. 3–5 constitutes the preferred circuitry for an all digital method for detecting the framing bit, 16, and distinguishing it from all other bits, 1-15, in the frame, 28.

FIG. 6 is a schematic diagram representing an alternative method and embodiment for detecting the framing bit, 16. The received, randomly selected bit logic levels, 401, are fed to the data input of flip-flop, 402, and to the second input, 403, of exclusive-OR gate, 404. The Q output, 405, of flip-flop, 402, is fed to the first input, 406, of exclusive-OR gate, 404. This gate's output, 407, will have a logic "1" level if and only if its two inputs, 403 and 406, are opposite in logic levels. This is the situation if and when the randomly selected bit is the valid framing bit. The reason is as follows:

The logic level input at the flip-flop's, 402, data input is shifted to the flip-flop's Q output at the next clock input positive transition. The flip-flop's clock input is the eight kilohertz signal, 408, the eight kilohertz signal, 303, of FIG. 5. Since the valid framing bit has an alternating logic "1", logic "0" pattern, the signals, 403 and 406, will be opposite in logic levels if and when the randomly selected bit is the valid framing bit. In the situation where the signals, 403 and 406, are like logic levels, an invalid framing bit has been selected, and the exclusive-OR gate's, 404, output, 407, goes to a logic "0" level. This logic "0" level is fed to the first input, 409, of NOR gate, 410, via a time constant circuit comprised of signal diode, 411, resistor, 412, and capacitor, 413. This time constant circuit prevents relatively narrow sliver pulses and error spikes from presenting a spurious signal to input, 409.

The second input, 414, of NOR gate 410 has a logic "1" level during the period of time that new information is being shifted into flip-flop, 402, in order to prevent the NOR gate's output from going to a logic "1" level during this period of time. This is accomplished by means of the time constant circuit comprised of signal diode 415, resistor 416, and capacitor 417. The NOR gate's, 410, output, 418, is fed to the clock input of flip-flop, 419. A logic "1" level, 420, is fed to the data input of flip-flop, 419, and, therefore, a positive transition at the clock input causes the flip-flop's Q output, 421, to go to a logic "1" level. This logic "1" level is fed to the flip-flop's reset input, 422, via a time constant circuit comprised of signal diode, 423, resistor, 424, and capacitor, 425. A signal, 426, resets flip-flop, 419, when the circuit is first powered up. The logic "1" level at flip-flop, 419, output, 421, is fed to the reset input, 427, of flip-flop, 402, and also, by means of signal lead, 428, to the other components of the framing circuit.

The framing circuit is caused to select another bit, within the frame for testing when the reset signal, 428, again returns to a logic "0" level.

The framed signals, the control signal and the data transmission signal from the central office terminal and the return data transmission signal from the subscriber terminal, or variations thereof, can then be advantageously used with the equipment shown in FIGS. 7 and 8 as follows:

FIG. 7 is a diagrammatic representation of the preferred central office terminal configuration. The incoming and outgoing broadband signals are carried through the central office terminal system on coaxial cable, 101. Signals are tapped on and off of the coaxial cable, 101, by use of conventional taps, 102. The common control signal circuit, 203, is the same in each of the two hundred fifty-six subscriber terminals, in that, it manages the channel assignments of one pair of twelve megahertz bands. The common control signal module, 203, consists of the common control logic circuit, 206, which formats the information received by circuit, 203, from the central office terminal logic control circuit, 208. This formatted digital common control signal is fed from the common logic control circuit, 206, to the common control transmitter, 205. The common control transmitter, 205, is crystal controlled and tuned to one assigned frequency within the twelve megahertz band transmitted from the central office terminal to the subscriber terminals.

The telephone line module, 204, contains the voice and data transmitter/receiver that are always paired with one assigned subscriber terminal. There may be two hundred fifty-six of these telephone line equipment modules at the central office location, each having a matching subscriber terminal.

Another embodiment (not shown) uses one transceiver per actual channel; i.e., a total of sixty-four transceivers, with a switching matrix connecting the transceivers to the two hundred fifty-six subscriber line interface circuits.

The receiver, 216, is tuned by means of the local oscillator signal generated in the phase locked loop frequency synthesizer 223. The frequency synthesizer 223 generates a local oscillator signal according to the binary coded signal it receives from the central office logic control circuit, 208. The receiver, 216, frequency corresponds to the frequency its matching subscriber terminal's transmitter is instructed to transmit on, if and when it is given the instruction to transmit. The receiver, 216, constantly monitors its assigned frequency and demodulates any received signal that exceeds its squelch threshold. Since more than one subscriber terminal may be instructed to use that frequency, on a first come, first served basis, the receiver, 216, will be instructed to stay on that frequency if and only if it is receiving a signal from its matching subscriber terminal. It will be immediately instructed to tune to a different frequency if a subscriber terminal other than its matching subscriber terminal is the first to transmit on that available frequency. The receiver's, 216, frequency changes, in that situation, to the same newly assigned frequency as its matching subscriber terminal's transmitter.

The demodulated signal is fed from the receiver 216 to the clock recovery circuit 217. The regenerated clock and digital signal is fed to the master synchronization recovery circuit 218. The recovered clock signal, the MSI signal and the digital signal is then fed to the address decoder 219, where, if the address of the received signal matches the address of this telephone line module 204, a signal is sent to the central office logic control circuit 208 indicating that the assigned channel is in use (and therefore the logic control circuit 208 reassigns all other subscriber terminals originally assigned to that frequency to other available frequencies). Assuming a valid address is received by a specific terminal, the clock signal, MSI signal and the digital signal are fed to the received data logic circuit 220 with the received data signals outputted on the received data terminal 221. The clock signal, MSI signal and digital signal are fed to the codec 213 where the voice information is converted from a digital to analog format. The voice signal is fed from the codec, 213, to the subscriber line interface circuit, 214. The received supervisory control signal is fed from the received data logic circuit, 220, to the subscriber line interface circuit, 214. The subscriber line interface circuit, 214, is connected to the central office line switching equipment at the subscriber line terminal, 215.

The telephone voice and supervisory control information to be sent to the subscriber terminal location from the central office location is fed from the subscriber line interface circuit 214 to the codec 213, where the voice information is digitized. The digitized voice information plus the supervisory control information is then fed to the transmit data logic circuit 211 and combined with the transmit data inputted on the transmit data terminal 210. This combined voice and data information is properly formatted and sent to the transmitter 212. The central office logic control circuit 208 receives, from the transmit data logic circuit 211, the indication that there is information to be sent to the matching subscriber terminal and therefore sends an enable signal to the matching subscriber terminal via the common control signal and also sends an enable signal back to the transmit data logic circuit 211, which is fed to the transmitter 212. The transmitter 212 provides a termination 104 equal to the characteristic impedance of the coaxial line.

Figure 8:
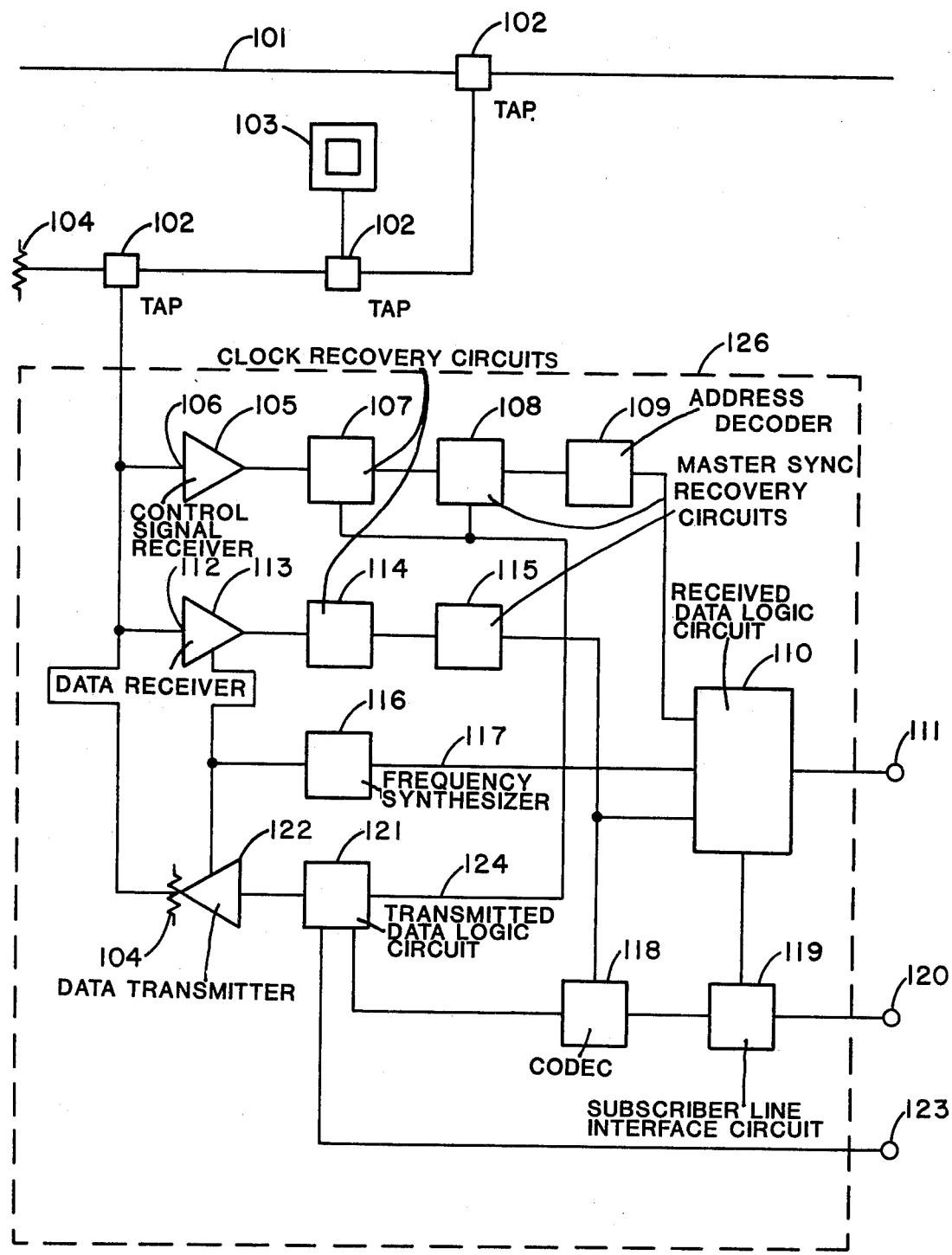
FIG. 8 is a diagrammatic representation of the referred subscriber terminal configuration.

FIG. 8 is a diagrammatic representation of the preferred subscriber terminal configuration. The coaxial cable transmission line 101, outside of the house, is tapped 102 using conventional CATV hardware and techniques. Inside the house, television service is tapped, 102, off of the coaxial cable using conventional CATV practice. This service is displayed on the subscriber's conventional television set 103. A third tap 102 connects the subscriber terminal 126 to the transmission system which is terminated in its characteristic impedance 104.

Inside the subscriber terminal 126 the common control signal is received and demodulated by the first receiver 105. The high impedance receiver input 106 receives the signal from the transmission medium in the 12-MHz frequency band that carries the information from the central office location to the subscriber locations.

The demodulated signal is fed to the clock recovery circuit 107 where the received digital signal regenerated clock signal is derived. This clock signal and the digital signal are fed to the master synchronization recovery circuit 108 where the framing pulse is detected and the MSI signal is derived. The clock signal, MSI signal and the digital signal are fed to the address code decoder 109 where the data relating only to that particular terminal location is decoded. The decoded information, relating to that particular terminal location, is fed to the received data logic circuit 110. The transmit enable signal 125 keys the transmitter 122 as instructed by the common control signal. The transmitter 122 is also keyed by the transmitted data logic circuit 121 if and when information originates at the subscriber location.

When the subscriber location has been activated by detection of its address in the control signal, voice and data information, sent from the central office terminal to the subscriber location over the assigned channel, is received at the second receiver's 113 high impedance input terminal 112 and demodulated. The frequency this second receiver is tuned to, within the 12-MHz band sent from the central office location to the subscriber locations, is determined by the local oscillator signal generated by the terminal's phase locked loop frequency synthesizer 116.

The frequency synthesizer 116 is controlled by the binary signal 117 it receives from the received data logic circuit 110. The demodulated second signal is fed from the second receiver 113 to the clock recovery circuit 114. The regenerated clock and the digital signal are fed to the master synchronization recovery circuit 115 where the framing pulse is detected and the MSI signal is generated. The second clock signal, the second MSI signal and the second digital signal are fed to the received data logic circuit 110 and to the codec 118. The received data information is outputted at the received data terminal 111. The received voice information is fed from the codec 118 to the subscriber line interface circuit 119. The received supervisory control information is fed from the received data logic circuit 110 to the subscriber line interface circuit 119. The subscriber's telephone set(s) are connected to the telephone interface terminal 120.

The telephone voice and supervisory control information to be sent from the subscriber to the central office location is fed from the subscriber line interface circuit 119 to the codec 118, where the voice information is digitized. The digitized voice information plus the supervisory control information is then fed to the transmit data logic circuit, 121, and combined with the transmit data inputted on the transmit data terminal, 123. This combined voice and data information is formatted per the above discussion and sent to the transmitter, 122, for transmission to the central office terminal. The transmitter, 122, frequency is determined by the local oscillator signal generated by the phase locked loop frequency synthesizer, 116. The control of the frequency synthesizer, 116, is discussed above. The transmitter, 122, output is terminated with the transmission medium's characteristic impedance, 104.

From a consideration of the foregoing disclosure it should be obvious that the invention is simply constructed, simply operable and economical to manufacture since all subscriber terminals are standardized and manufactured from inexpensive and easily obtainable components. As a consequency, the invention as a whole is not susceptible to the complexities of the prior art. It should be understood that modifications and variations beyond those described and discussed may be resorted to without departing from the spirit of the invention as those skilled in the art will readily understand. Such modifications and variations are considered and intended to be within the purview and scope of the present invention as defined by the following claims.

Having described my invention, I claim:

1. A digital subscriber communications system having means for transmitting and receiving a plurality of time-division multiplexed signals, each signal having a series of frames and a predetermined number of binary digits per frame, between a central office location and multiple subscriber locations characterized in that:

the means for transmitting the signals comprises;
  means for generating a separate master synchronization signal for each signal transmitted;
  means connected to the synchronization signal generating means for encoding each of the signals for transmission with an optimum frame format and optimum bit format within each frame wherein each frame comprises fifteen information bits per frame and one framing bit per frame thereby creating a frame format having sixteen bits per frame; and transmitter means for transmitting each signal in the sixteen bit frame format; and the means for receiving the signals comprises:
means for detecting the framing bit in each frame;
means connected to the framing bit detecting means for recovering the master synchronization signal; and
means for decoding the information in each frame according to the frame format and bit format in each frame established by the framing bit and the master synchronization signal.

2. The digital subscriber communications system of claim 1 wherein the means for transmitting the signals comprises means for transmitting each signal at a rate of one hundred twenty-eight kilobits per second.

3. The digital subscriber communications system of claim 1 wherein the means for transmitting the signals comprises means for transmitting each signal at a rate of eight thousand frames per second.

4. The digital subscriber communications system of claim 1 wherein the system comprises, means for transmitting signals from the central office location to the multiple subscriber locations and means for transmitting signals from each of the multiple subscriber locations to the central office location so that signals are transmitted in both directions.

5. The digital subscriber communications system of claim 4 wherein the means for transmitting the signals comprises means for frequency-division multiplexing the signals within a pair of predetermined frequency bands, one for each direction of transmission, onto a single broadband cable for transmission of information between the central office location and the multiple subscriber locations.

6. The digital subscriber communications system of claim 4 wherein the means for transmitting the signals comprises means for transmitting the signals on fiber optics, one fiber for each direction of transmission between the central office location and the multiple subscriber locations.

7. The digital subscriber communications system of claim 1 wherein the means for transmitting a plurality of signals comprises means for transmitting a master control signal sent from the central office location to all of the multiple subscriber locations.

8. The digital subscriber communications system of claim 1 wherein the means for transmitting a plurality of signals comprises means for transmitting individual signals from the central office location to each of the multiple subscriber locations.

9. The digital subscriber communications system of claim 1 wherein the means for transmitting a plurality of signals comprises means for transmitting individual signals from each subscriber to the central office location.

10. The digital subscriber communications system of claim 7 wherein the means for transmitting a master control signal comprises:
means for generating an address for one of the subscribers;
means for selectively generating other data to be transmitted to the subscriber;
means for generating a framing bit;
means for converting the address, data bits and framing bit into a sixteen bit serial format to be transmitted; and
wherein the sixteen bit per frame format used for the master control signal sent to all subscribers comprises eight address bits to address a particular subscriber, seven other data bits and the framing bit.

11. The digital subscriber communications system of claim 10 wherein the eight address bits are used to address one of two hundred fifty-six subscribers.

12. The digital subscriber communications system of claim 8 wherein the means to transmit individual signals to each subscriber comprises:
means for converting voice information to digital data bits;
means for selectively generating other data to be transmitted to each subscriber;
means for generating a framing bit; and
means for converting the voice bits, other data bits and framing bit into a sixteen bit serial format to be transmitted; and
wherein the signals to each subscriber have a frame format with eight digitized voice bits, seven other logic based data bits and the framing bit.

13. The digital subscriber communications system of claim 9 wherein the means to transmit individual signals from each subscriber comprises:
means for converting voice information to digital data bits;
means for selectively generating other data to be transmitted from each subscriber;
means for generating a framing bit; and
means for converting the voice bits, other data bits and framing bit into a sixteen bit serial format to be transmitted; and
wherein the signals from each subscriber have a frame format with eight digitized voice bits, seven other logic based data bits and the framing bit.

14. The improvement of claim 1 wherein the means for transmitting a plurality of signals comprises means for transmitting a master control signal from the central office location to all of the multiple subscriber locations, means for transmitting individual signals from the central office location to any one of the subscribers and means for transmitting individual signals from any one of the subscribers to the central office location and wherein the means for transmitting a master control signal sent to all subscribers comprises means for generating and transmitting signals having eight address bits to address one of two hundred fifty-six subscribers, seven data bits for that subscriber and a framing bit and wherein the means for transmitting signals to each subscriber and from each subscriber comprise means for generating and transmitting signals having a frame format with eight digitized voice bits, seven other logic based data bits and the framing bit in each frame.

15. The digital subscriber communications system of claim 1 wherein the means for transmitting the plurality of signals comprises:
means for generating a master synchronization signal having two logical states;
means for generating the framing bit;
means for converting data information into logic based bits and means for serially transmitting the logic based bits and a framing bit in a frame format so that information is transmitted during both logic states of the master synchronization signal; and
wherein the means for receiving the plurality of signals comprises means for recovering the master synchronization signal from the framing bit so that a received master synchronization signal is generated from each transmitted signal which is used to derive the information within the frame format.

16. The digital subscriber communications system of claim 15 further comprising means for phasing the master synchronization signal with the framing bit in each frame.

17. The digital subscriber communications system of claim 1 wherein the means for transmitting signals comprises means for converting voice information to digital data bits and wherein the plurality of signals comprises signals wherein the sixteen bit per frame format is used to carry voice information.

18. The digital subscriber communications system of claim 1 wherein each of the multiple subscribers has an assigned binary address and wherein the means for transmitting the plurality of signals comprises means for generating and transmitting serial address codes wherein the sixteen bit per frame format is used to carry subscriber address information.

19. The digital subscriber communications system of claim 1 wherein the means for transmitting the plurality of signals comprises means for generating and transmitting logic based data information and wherein at least one of the transmitted signals is used to carry housekeeping or other logic based data services information.

20. The digital subscriber communications system of claim 17 wherein the means for transmitting a plurality of signals comprises means for generating and transmitting logic based data information and wherein at least one of the transmitted signals is used to carry both voice and data information.

21. The digital subscriber communications system of claim 15 wherein the means for receiving the plurality of signals comprises means for decoding the transmitted signal connected to the means for recovering the master synchronization signal wherein the logic states of the master synchronization signal is used to divide each frame into two distinct frame halves of eight bits per frame.

22. The digital subscriber communications system of claim 21 wherein means for serially transmitting the logic based bits transmits the information in frames, each frame consisting of one complete cycle of the master synchronization signal and wherein one frame half is used to transmit voice information and the other frame half is used to transmit data other than voice information and the framing bit.

23. The digital subscriber communications system of claim 21 wherein means for serially transmitting the logic based bits transmits the information in frames, each frame consisting of one complete cycle of the master synchronization signal and wherein one frame half is used to transmit binary address information and the other frame half is used to transmit information other than binary address information and the framing bit.

24. The digital subscriber communications system of claim 5 wherein each subscriber location comprises a fixed frequency receiver tuned to a particular channel which carries information from the central office terminal to all the subscriber terminals, and, wherein means for transmitting the signal on this channel comprises means for generating data signals in a sixteen bit frame format such that:
the first eight bits of each frame contain a binary address code, which directs the information contained in the second group of eight bits of each frame to one of the subscriber terminals;
the means for converting data information into logic based bits comprises means for converting voice information into logic based bits and means for converting data other than voice information into logic based bits; and
the second eight bits in each frame comprise:
a framing bit to define the framing format; and
at least one bit carrying information assigning the addressed subscriber terminal to a particular frequency-division multiplexed channel within the pair of frequency bands.

25. The digital subscriber communications system of claim 1 wherein the means for receiving the signals comprises means for randomly testing the bits within each frame of each transmitted signal to locate the framing bit.

26. The digital subscriber communications system of claim 25 wherein each framing bit is encoded with a distinct and recognizable pattern and all other bits are restricted from carrying such a pattern for more than a given period of time.

27. The digital subscriber communications system of claim 26 wherein the pattern of the framing bit is an alternating logic "1", logic "0" pattern.

28. The digital subscriber communications system of claim 25 wherein the means for randomly testing bits to locate the framing bit comprises
means for randomly selecting a bit within each received frame and
means for determining if this bit violates an alternating logic "1", logic "0" pattern.

29. The digital subscriber communicates system of claim 28 wherein the means for randomly selecting a bit within the received frame comprise a framing circuit and wherein the means for determining if the bit violates an alternating logic "1", logic "0" pattern comprise
a flip-flop connected to the randomly received bit logic level for generating a check signal having a frequency of one-half the framing rate if the randomly selected bit is the valid framing bit; and
a logic divider circuit for establishing check points at which the logic level of the check signal is tested; and
means for generating an error signal if the bit logic level violates the alternating logic "1" and logic "0" pattern.

30. The digital subscriber communications system of claim 29 wherein the logic divider circuit comprises means for dividing each check and signal cycle into eight check points of equal spacing and wherein the selected bit logic level is tested at the third, fifth and seventh check point.

31. The digital subscriber communications system of claim 29 wherein the means for randomly testing bits to locate the framing bit comprises
a shift register connected to the check signal for testing for repetitive zeros.

32. The digital subscriber communications system of claim 28 wherein the means for determining if the bit violates an alternating logic "1", logic "0" pattern comprises a first flip-flop connected to the logic level of the randomly selected bit
am exclusive OR gate having two inputs one of which is connected to the output of the first flip-flop and the other input being connected to the randomly selected bit logic level so that the inputs to the exclusive OR gate indicate the logic level of two successive framing bits and so that the output of the exclusive OR gate will have a logic "1" level only if the randomly selected bit is the valid framing bit.

33. The digital subscriber communications system of claim 32 further comprising
a second flip-flop connected to the framing circuit to reset the framing circuit in the event an invalid framing bit has been selected;
a NOR gate having two inputs the output of which is connected to the second flip-flop to clock the flip-flop to cause the framing circuit to be reset;
a first time delay circuit connected between the exclusive OR gate and one input of the NOR gate for preventing relatively narrow error pulses to the NOR gate input; and
a second time delay circuit connected between the first flip-flop and the second input to the NOR gate for stabilizing the NOR gate's output during the transitions of the first flip-flop's input.

34. A method of operating a digital subscriber communications system wherein a plurality of digital signals, each having a series of frames and a predetermined number of binary bits per frame, are transmitted between a central office location and multiple subscriber locations comprising:
generating a master synchronization signal to establish an optimum frame format for each transmitted signal and a framing bit for each frame;
encoding the signals with the optimum frame format and an optimum bit format within each frame wherein each frame comprises fifteen information bits per frame and one framing bit per frame thereby creating a frame format having sixteen bits per frame;
transmitting the signals at an eight thousand frame per second rate;
receiving the transmitted signal as a series of binary bits;
detecting the framing bit in each frame;
using the framing bit in each frame to recover and phase a master synchronization signal for each digital signal received;
using the synchronization signal for decoding the information in each frame according to the bit and frame format.

35. The method of claim 34 wherein the method further comprises the step of digitizing voice information for transmission and wherein the synchronization signal is used for decoding digitized voice information according to the bit and frame format.

36. The method of claim 34 wherein the method further comprises the step of digitizing address information for transmission and wherein the synchronization signal is used for decoding digitized address information according to the bit and frame format.

37. The method of claim 34 wherein the method further comprises the step of digitizing logic based data information for transmission and wherein the synchronization signal is used for decoding logic based data information according to the bit and frame format.

38. The method of claim 34 wherein the step of detecting the framing bit in each transmitted signal is an all digital method of testing comprising:
selecting a bit from each frame;
converting the selected bit to a logic signal; and
digitally testing the levels of the logic signal to determine whether the selected bit is the framing bit.

39. The method of claim 34 wherein the framing bit is transmitted according to a predetermined pattern and wherein the step of detecting the framing bit in each transmitted signal is a direct method of testing comprising:
selecting a bit from each frame; and
comparing the selected bit with a signal having the predetermined pattern of the framing bit to determine whether the selected bit is the framing bit.

40. The method of claim 34 wherein the step of detecting the framing bit in each transmitted signal comprises
randomly selecting a bit within each received frame; and
testing the logic level of the randomly selected bit to determine if the bit violates an alternating logic "1", logic "0" pattern.

41. The method of claim 34 wherein the step of detecting the framing bit in each transmitted signal comprises
generating a check signal having a frequency of one-half the framing rate if the randomly selected bit is the valid framing bit;
dividing each check signal into eight check points of equal spacing;
testing for repetitive zeros by shifting the check signal through a shift register;
testing the logic level of the check signal at a plurality of other points to determine if a valid framing bit has been selected;
generating an error signal if the proper framing bit has not been selected; and
choosing another bit within the frame to check in the event an error signal is generated.

* * * * *

UNITED STATES PATENT AND TRADEMARK OFFICE
CERTIFICATE OF CORRECTION

PATENT NO. : 4,390,986
DATED : June 28, 1983
INVENTOR(S) : Donald W. Moses

It is certified that error appears in the above—identified patent and that said Letters Patent is hereby corrected as shown below:

Column 3, line 46, "operation" should read --operating--.

Column 7, line 17, "handpass" should read --bandpass--.

Column 8, line 61, "digial" should read --digital--.

Column 9, line 32, "19" should read --319--.

Column 9, line 47, the "o" between "input" and "NAND" should read --of--.

In the Claims

Claim 29; column 18, line 30, "communicates" should read --communications--.

UNITED STATES PATENT AND TRADEMARK OFFICE
CERTIFICATE OF CORRECTION

PATENT NO. : 4,390,986

DATED : June 28, 1983

INVENTOR(S) : Donald W. Moses

It is certified that error appears in the above—identified patent and that said Letters Patent is hereby corrected as shown below:

The first six lines of claim 32 should read as follows:

32. The digital subscriber communications system of claim 28 wherein the means for determining if the bit violates an alternating logic "1", logic "0" pattern comprises:

a first flip-flop connected to the logic level of the randomly selected bit; and an exclusive OR gate having two inputs one of which Signed and Sealed this Sixth Day of December 1983

[SEAL]

Attest:

GERALD J. MOSSINGHOFF

Attesting Officer

Commissioner of Patents and Trademarks